US009823559B2

(12) United States Patent
Kato (10) Patent No.: US 9,823,559 B2
(45) Date of Patent: Nov. 21, 2017

(54) LIGHT SOURCE DEVICE, PROJECTOR AND CONTROL METHOD OF LIGHT SOURCE DEVICE

(71) Applicant: NEC Display Solutions, Ltd., Tokyo (JP)

(72) Inventor: Atsushi Kato, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/321,695

(22) PCT Filed: Aug. 6, 2014

(86) PCT No.: PCT/JP2014/070727
§ 371 (c)(1),
(2) Date: Dec. 22, 2016

(87) PCT Pub. No.: WO2016/021002
PCT Pub. Date: Feb. 11, 2016

(65) Prior Publication Data
US 2017/0139312 A1 May 18, 2017

(51) Int. Cl.
*G03B 21/20* (2006.01)
*H04N 9/31* (2006.01)
*G02B 26/00* (2006.01)

(52) U.S. Cl.
CPC ......... *G03B 21/208* (2013.01); *G02B 26/008* (2013.01); *G03B 21/204* (2013.01);
(Continued)

(58) Field of Classification Search
CPC ...... G03B 21/204; G03B 21/14; G03B 21/20; G03B 21/2093; G03B 21/208;
(Continued)

(56) References Cited

U.S. PATENT DOCUMENTS

2012/0188519 A1* 7/2012 Willett ................. G03B 21/204
353/31
2012/0249972 A1* 10/2012 Kurosaki ........... G03B 21/2013
353/31

FOREIGN PATENT DOCUMENTS

JP 2002-328332 A 11/2002
JP 2005-517366 A 6/2005
(Continued)

OTHER PUBLICATIONS

International Search Report (ISR) (PCT Form PCT/ISA/210), in PCT/JP2014/070727, dated Nov. 11, 2014.

*Primary Examiner* — Ryan Howard
(74) *Attorney, Agent, or Firm* — McGinn IP Law Group, PLLC.

(57) ABSTRACT

A light source device includes: a light source for emitting excitation light; a first optical system for condensing excitation light emitted from the light source into a rectangular shape; a fluorescent wheel having a plurality of light emitting portions emitting different color light in response to irradiation of the excitation light formed in such a manner in which each of the multiple light emitting portions is irradiated with the excitation light condensed in a rectangular shape by the first optical system; a second optical system for condensing color light emitted from each of the multiple light emitting portions in response to irradiation of the rectangularly condensed excitation light; and a rotating prism that is rotatably arranged on the optical path of the light condensed by the second light source and that shifts the optical axis of the light condensed by the second optical system as the prism turns.

10 Claims, 8 Drawing Sheets

(52) U.S. Cl.
CPC ....... *G03B 21/2046* (2013.01); *H04N 9/3185* (2013.01); *H04N 9/3129* (2013.01)

(58) Field of Classification Search
CPC .. G03B 21/2046; H04N 9/3129; H04N 9/315; H04N 9/3152; H04N 9/3161; H04N 9/3164; G02B 26/008
USPC .......................................... 359/211.1, 211.2
See application file for complete search history.

(56) References Cited

FOREIGN PATENT DOCUMENTS

| | | |
|---|---|---|
| JP | 2005-345887 A | 12/2005 |
| JP | 2009-277516 A | 11/2009 |
| JP | 2010-085740 A | 4/2010 |
| WO | WO 2014/064743 A1 | 5/2014 |
| WO | WO 2014/115492 A1 | 7/2014 |

\* cited by examiner

LIGHT SOURCE DEVICE, PROJECTOR AND CONTROL METHOD OF LIGHT SOURCE DEVICE

TECHNICAL FIELD

The present invention relates to a light source device, projector and control method of a light source device.

BACKGROUND ART

In most cases white lamps have been used as the light source of the projector that modulates light emitted from a light source by use of a modulating element to project the modulated light. Recently, as the light source of the projector, solid-state light sources such as LEDs (Light Emitting Diode) and laser light sources have come to be used.

Patent Document 1 (JP2009-277516A) and Patent Document 2 (JP2010-85740) disclose projectors that use blue semiconductor lasers as the light source. In Patent Documents 1 and 2, the projectors include a fluorescent wheel of a circular substrate that is rotatably provided and divided into three sectorial segment areas that are formed with a red-light emitting phosphor, green-light emitting phosphor and blue-light emitting phosphor, respectively. Irradiation of the laser light emitted from the blue semiconductor laser on partial areas of the fluorescent wheel causes red light, green light and blue light to be emitted time-divisionally, so that these color light are successively irradiated on a DMD (Digital Mirror Device), which modulates and projects each color light in accordance with the signal component corresponding to the color of light.

In general, in order to obtain high luminance fluorescence, the power of excitation light may and should be increased. In order to enhance the power of the excitation light, the number of semiconductor lasers may and should be increased. Accordingly, projection of high luminance light can be performed in the projectors disclosed in Patent Documents 1 and 2.

RELATED ART DOCUMENTS

Patent Documents

Patent Document 1: JP2009-277516A
Patent Document 2: JP2010-85740A

SUMMARY

Problems to be Solved by the Invention

Known as one of projection systems for projectors has been the scroll system. The scroll system is a system which projects color images by irradiating a color band formed of multiple color light (e.g., red light, green light and blue light) on a modulating element while scrolling the irradiating position and which drives the modulating element in accordance with change of each color light in irradiating position. Since, in the scroll system, the modulating element is constantly irradiated with multiple colors of light, it is possible to obtain higher luminance projection images than in systems in which colors of light are radiated time-divisionally.

Further, the projectors disclosed in Patent Documents 1 and 2 entail the problem that, when the laser light is irradiated on the boundary between adjacent segment areas, color mixture takes place, thus degrading color reproducibility of the projected image. It is also possible to consider a configuration that suspends irradiation of laser light during the time zone in which the laser light is irradiated on the boundary between adjacent segment areas. However, suspension of irradiation of laser light reduces the available amount of visible light, so that the luminance of the projected light results in being lowered.

There have been investigations into methods of forming a color band of red light, green light and blue light by use of a white light source. However, methods of forming a color band using a solid-state light source have not yet been fully investigated.

The object of the present invention is to provide a light source, device, projector and control method of a light source device which enable projection of high luminance and high color reproducibility, by forming a color band of multiple colors of light.

Means for Solving the Problems

In order to achieve the above object, an exemplary aspect of a light source device of the present invention includes:
a light source for emitting excitation light;
a first optical system for condensing excitation light emitted from the light source into a rectangular shape;
a fluorescent wheel having a plurality of light emitting portions emitting different color light in response to irradiation of the excitation light formed in such a manner in which each of the multiple light emitting portions is irradiated with the excitation light condensed in a rectangular shape by the first optical system;
a second optical system for condensing color light emitted from each of the multiple light emitting portions in response to irradiation of the rectangularly condensed excitation light; and
a rotating prism that is rotatably arranged on the optical path of the light condensed by the second light source and that shifts the optical axis of the light condensed by the second optical system as the prism turns.

In order to achieve the above object, an exemplary aspect of a projector of the present invention includes:
the above light source device;
a modulating element that is irradiated with light emitted from the rotating prism and modulates the irradiated light;
a projecting optical system that projects the light modulated by the modulating element; and,
a control unit that controls the operation that drives the modulating element in accordance with changes in the irradiated position of each color light included in the light, resulting from the shift of the optical axis of the light emitted from the rotating prism.

In order to achieve the above object, an exemplary aspect of a control method of a light source device of the present invention includes the steps of:
emitting excitation light;
condensing the emitted excitation light into a rectangular shape;
irradiating a fluorescent wheel formed with a plurality of light emitting portions for emitting different color light in response to irradiation of the excitation light in such a manner in which each of the multiple light emitting portions is irradiated with the excitation light condensed in a rectangular shape;
condensing color light emitted from each of the multiple light emitting portions in response to irradiation of the rectangularly condensed excitation light; and shifting the optical axis of the condensed light of color light emitted from each of the multiple light emitting portions, by a rotating prism that is rotatably provided on the optical path of the condensed light of color light emitted from the multiple light emitting portions.

Effect of the Invention

According to the present invention, it is possible to achieve projection of high luminance and high color reproducibility, by forming a color band of multiple colors of light.

EXEMPLARY EMBODIMENT

Hereinbelow, a mode for carrying out the present invention will be described with reference to the drawings. In the drawings, the same components are allotted with the same reference numerals with description being omitted.

(The First Exemplary Embodiment)

Figure 1:
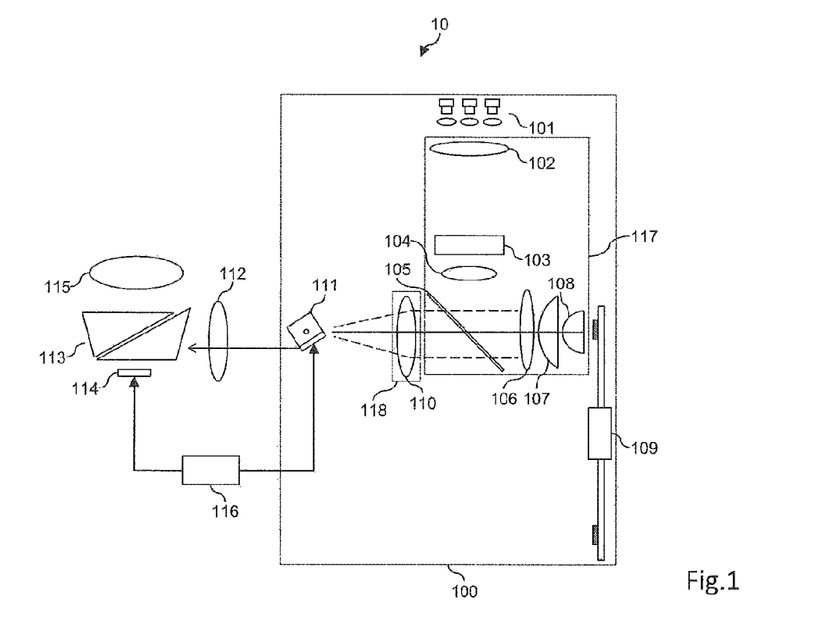
FIG. 1 is a diagram showing a configuration of a projector according to the first exemplary embodiment of the present invention.

FIG. 1 is a diagram showing a configuration of projector 10 in which light source device 100 is built-in according to the first exemplary embodiment of the present invention. This exemplary embodiment will be explained by giving an example in which projector 10 is a single plate DLP (Digital Light Processing) projector.

Projector 10 shown in FIG. 1 includes light source device 100, relay lens 112, TIR (Total Internal Reflection) prism 113, DMD 114 and projecting lens 115. Light source device 100 includes light source 101, illuminating lens systems 102 and 104, fly eye lens 103, dichroic mirror 105, condenser lens systems 106, 107 and 108, fluorescent wheel 109, condenser lens 110 and rotating prism 111.

Light source 101 is a solid-state light source emitting laser light. A semiconductor laser that emits blue light or near-ultraviolet light may be used as light source 101. In this exemplary embodiment, light source 101 uses a laser light source emitting laser light having wavelengths of about 400 to 410 nm.

Though three light sources 101 are shown in FIG. 1, the number of light sources is not limited to this. The number of light sources 101 can be determined depending on the brightness specified by the specifications of projector 10. A typical projector that can create high luminance may and could use some tens of laser light sources.

Illuminating lens system 102 approximately collimates the laser light emitted from light source 101 and sends out the light to fly eye lens 103.

Fly eye lens 103 is a lens array formed with a large number of rectangular lenses. Fly eye lens 103, in order to uniformize the luminance of light emitted from illuminating lens system 102, divides the light into a large number of light beams having a rectangular section normal to the optical axis and sends out the light to illuminating lens system 104. Glass material, optical plastic and others may be used as the material of fly eye lens 103. Further, a pair of fry eye lens may be used as a set and may be arranged at a predetermined distance apart from each other. It is also possible to use a solid rod integrator or light tunnel instead of fly eye lens 103.

Illuminating lens system 104 makes the light coming from fly eye lens 103 pass therethrough to dichroic mirror 105.

Dichroic mirror 105 is characterized by reflecting a specific band of light while allowing the other bands to pass therethrough. This characteristic is the same as that of thin-film mirror of a dielectric multilayer film that is often used in liquid crystal projectors and others, and can be realized using well-known technologies.

As described above, light source 101 emits laser light having wavelengths of about 400 to 410 nm. In this exemplary embodiment, dichroic mirror 105 has characteristics that reflect light having wavelengths of 410 nm or lower and transmit visible light bands of red, green and blue colors, specifically allow light of wavelengths of about 440 nm to 700 nm to pass therethrough.

Condenser lens systems 106, 107 and 108 condense light (multiple light beams having a rectangular section) reflected on dichroic mirror 105 and superpose the multiple beams in a rectangular shape on fluorescent wheel 109.

In this way, in the present exemplary embodiment the laser light emitted from light source 101 passes through first optical system 117 comprised of illuminating lens systems 102, 104, fly eye lens 103, dichroic mirror 105, condenser lens systems 106, 107 and 108 and is condensed on fluorescent wheel 109 in a rectangular shape.

Figure 2:
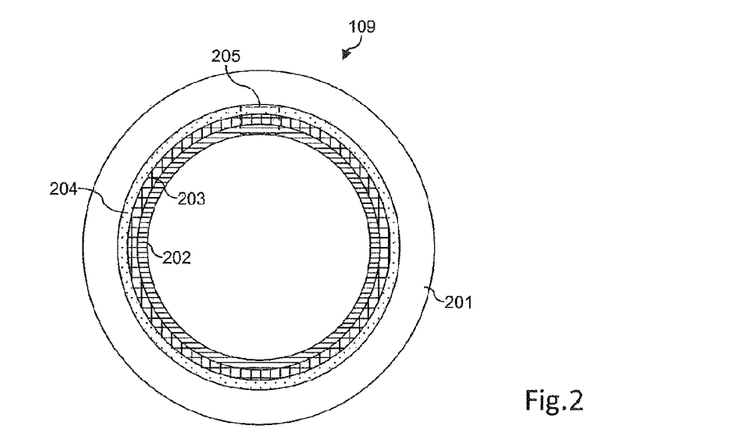
FIG. 2 is a diagram showing a configuration of the fluorescent wheel shown in FIG. 1.

FIG. 2 is a diagram showing a configuration of fluorescent wheel 109.

Fluorescent wheel 109 shown in FIG. 2 includes circular substrate 201, phosphors 202, 203 and 204.

Substrate 201 is formed of glass, sapphire or the like having a thickness of some millimeters. Substrate 201 may also be formed of metal.

Phosphors 202, 203 and 204 emit a blue band fluorescence (blue light), a green band fluorescence (green light) and a red band fluorescence (red light), respectively, in response to illumination of laser light emitted from light source 101. In this way, fluorescent wheel 109 has multiple light emitting portions that emit different color light in response to irradiation of laser light. In a word, light source 101 works as an excitation light source.

Here, the above-described phosphors emitting different colors of fluorescence are commercially available.

Phosphors 202, 203 and 204 are formed concentrically as shown in FIG. 2. Phosphor 202 and phosphor 203 are arranged adjacent to each other, phosphor 203 being arranged adjacent to phosphor 204. For example, the phosphors can be formed with high accuracy without any gaps by applying fluorescent materials using a printing technique, then sintering or by any other process.

Fluorescent wheel 109 further includes an unillustrated motor and hence can rotate. Fluorescent wheel 109 as it rotates, increases cooling effect so that it is possible to avoid breakage and fusion of fluorescent wheel 109 even if irradiated with a high power excitation light. When substrate 201 is formed of sapphire, a further enhanced cooling effect can be obtained thanks to the sapphire's properties, or high thermal conductivity. As a result, it is possible to obtain stable light with high luminance. Various kinds of coatings may be applied to substrate 201 on the side to which the excitation light is incident or on the fluorescent material surface. For example, AR (Anti-Reflective) coating, dichroic coating and other various kinds of coatings may be selected depending on the purpose.

Referring again to FIG. 1, the light emitted from the phosphors on fluorescent wheel 109 in response to irradiation of excitation light, passes through condenser lenses 106, 107, 108 and dichroic mirror 105 to irradiate condenser lens 110.

Condenser lens 110 condenses the incident light into a shape (rectangular shape) approximately similar to the shape of the display area of DMD 114 and sends out the condensed light to rotating prism 111. Condenser lens 110 constitutes second optical system 118.

Here, illuminating lens systems 102, 104, condenser lens systems 106, 107, 108 and condenser lens 110 are formed of optical glass and other materials. Because light source 101 emits laser light, it is preferable that materials be selected by taking into account the deterioration of materials and the deterioration of coatings due to laser light. Further, though, in the present exemplary embodiment, multiple lenses are used in combination, various factors such as the number of lens, the curvature of each lens and others considerations should be taken into account, as appropriate, when creating a design to comply with the specifications of projector 10.

Rotating prism 111 is a quadrangular prim having a square section and formed of glass, for example. Rotating prism 111 is driven to rotate by an unillustrated rotation driving means, i.e., a drive motor. Rotating prism 111 is disposed on the optical path of the light condensed by condenser lens 110 and shifts the optical axis of the light condensed by condenser lens 110 and sends out the light to relay lens 112.

Relay lens 112 is a lens that focuses the light coming from rotating prism 111 on the display area of DMD 114 at a predetermined magnification ratio. Relay lens 112 is formed of, for example, optical glass or the like and is designed as appropriate in conformity with the specifications of projector 10. Here, relay lens 112 can be constituted of multiple lenses. Also, relay lens 112 may be formed of plastic material for optical usage.

TIR prism 113 plays a role of deflecting the light (illuminating light) emitted from relay lens 112 toward DMD 114 and a role of conducting the light reflected on DMD 114 to projecting lens 115.

DMD 114 is a micro display having a large number of movable micromirrors. DMD 114, by controlling drives of individual micromirrors, modulates the illuminating light emitted from relay lens 112 and transmitted through TIR prism 113 and allows the modulated light to go out. DMD 114 is one example of a modulating element.

Projecting lens 115 magnifies the light that is emitted from DMD 114 and that passed through TIR prism 113 and projects the magnified light. Projecting lens 115 may be configured of lenses alone, or may be configured of lenses and reflectors.

Control unit 116 controls the rotation of rotating prism 111 and controls the operation to drive DMD 114.

Next, the operation of projector 10 will be described with reference to FIG. 1.

Light source 101 emits laser light (excitation light). Illuminating lens system 102 approximately parallelizes the emitted light from light source 101 and sends out the light to fly eye lens 103. Fly eye lens 103 divides the light emitted from illuminating lens system 102 into a large number of light beams having a rectangular section normal to the optical axis and sends out the light to illuminating lens system 104. Illuminating lens system 104 makes the light coming from fly eye lens 103 pass therethrough to dichroic mirror 105.

As described above, dichroic mirror 105 has characteristics that, of the light emitted from light source 101, reflect light having wavelengths of 410 nm or lower and transmit light of wavelengths of about 440 nm to 700 nm to pass therethrough. Accordingly, dichroic mirror 105 reflects the light (excitation light) emitted from illuminating lens system 104 towards condenser lens system 106.

Condenser lens systems 106, 107 and 108 condense multiple light beams having a rectangular section normal to the optical axis and reflected on dichroic mirror 105 and superpose the multiple beams in a rectangular shape on fluorescent wheel 109. Specifically, the excitation light emitted from light source 101 is condensed on rectangular area 205 as shown in FIG. 2. In this exemplary embodiment, the lens and other elements involved are designed so that phosphors 202, 203 and 204 are contained in rectangular area 205. Since phosphors 202, 203 and 204 are formed concentrically (in annular forms) as described above, it is possible to have each strip of phosphors 202, 203 and 204 contained in rectangular area 205.

It should be noted that adjustment in size of the rectangular lenses forming fly eye lens 103 and the condenser lens systems for condensing light emitted from fly eye lens 103 makes it possible to control the size of rectangular area 205.

Since laser light is condensed on rectangular area 205 containing each of phosphors 202, 203 and 204, all the phosphors 202, 203 and 204 are irradiated with excitation light. As a result, each of phosphors 202, 203 and 204 gives off fluorescence.

Figure 3:
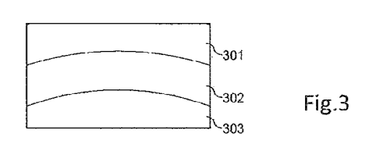
FIG. 3 is a diagram showing a color band obtained in the light source device shown in FIG. 1.

FIG. 3 is a diagram showing how emission of light takes place from fluorescent wheel 109.

As described above, excitation light is irradiated on rectangular area 205 containing strips of phosphors 202, 203 and 204. Accordingly, as shown in FIG. 3 a rectangular light ray flux (color band) in which strips of blue light 301, green light 302 and red light 303 appear is obtained on fluorescent wheel 109.

Laser light emitted from light source 101 is made uniform in luminance and irradiated on the phosphor surface by means of fly eye lens 103. Rotation of fluorescent wheel 109 also functions for cooling. Therefore, it is possible as shown in FIG. 3 to continuously obtain a rectangular color band consisting of three colors of light in a stable manner.

Figure 4:
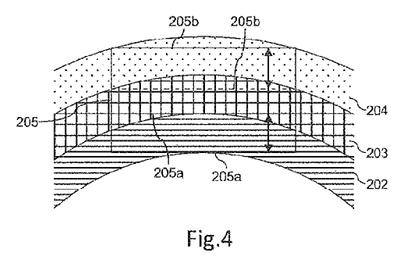
FIG. 4 is a diagram for illustrating the range of irradiation with excitation light on the fluorescent wheel shown in FIG. 2.

It should be noted that in order to obtain a rectangular color band formed of three colors of light (blue light, green light and red light), rectangular area 205 needs to be properly set. Referring next to FIG. 4 the range in which rectangular area 205 is set up will be described. Description herein in FIG. 4 will be given the following terms: the side of rectangular area 205 close to the center of the phosphor wheel is bottom side 205a and the side opposing bottom side 205a is upper side 205b.

In order to obtain the above-described color band, rectangular area 205 needs to be included within the zone where the phosphors are formed and include all three kinds of phosphor-formed regions.

To satisfy this, bottom side 205a is required to lie between the position where it is in contact with the inner circle of the innermost annular phosphor 202 and the position where it is in contact with the outer circle of phosphor 202 (the position indicated by the broken line in FIG. 4).

If bottom side 205a is positioned on the interior side of the inner circle of phosphor 202, rectangular area 205 comes to include a region where no phosphor is formed, hence a rectangular color band cannot be obtained. When bottom side 205a is positioned on the exterior side of the outer circle of phosphor 202, rectangular area 205 does not include phosphor 201, so that the resulting color band cannot include blue light.

On the other hand, upper side 205b is required to lie between the position where both ends of upper side 205b are in contact with the outer circle of annular phosphor 203 and the position where both ends of upper side 205b are in contact with the outer circle of the outermost annular phosphor 204 (the position indicated by the one dot chain line in FIG. 4).

If upper side 205b is set on the interior side rather than the position where both ends of the upper side come into contact with the outer circle of annular phosphor 203, rectangular area 205 will not include phosphor 204 that emits red light so that the color band comes not to contain red light. On the other hand, when upper side 205b is set on the exterior side of the position where both ends of the upper side come into contact with the outer circle of the outermost annular phosphor 204, rectangular area 205 comes to include a region where no phosphor is formed, hence a rectangular color band cannot be obtained.

Here, bottom side 205a and/or upper side 205b is perpendicular to the straight line that cuts through the rotational center of wheel 109. The width of rectangular area 205 is determined depending on the shorter side of bottom side 205a and upper side 205b.

Referring again to FIG. 1, light (color band) emitted from the phosphors of fluorescent wheel 109 passes through condenser lens systems 106, 107, 108 and dichroic mirror 105 to be incident on condenser lens 110, as indicated by the broken line in FIG. 1. Condenser lens 110 condenses the incident light in a shape approximately similar to the display area of DMD 114 and sends out the light to rotating prism 111.

Rotating prism 111 rotates under the control of control unit 116. The light incident on rotating prism 111 goes out from a varying position based on the refraction index of rotating prism 111 as the rotating prism turns. That is, rotating prism 111 shifts the optical axis of the light (color band) emitted from condenser lens 110 as the prism is turning and sends out the light to relay lens 112.

Relay lens 112 focuses the light emitted from rotating prism 111 at a predetermined magnification ratio on the display area of DMD 114 via TIR prism 113. As mentioned above, the optical axis of the color band shifts as rotating prism 111 turns. This shifting motion of the optical axis scrolls the color band focused on the display area of DMD 114. As the color band is scrolled, the irradiated position of each color light (red light, green light, blue light) contained in the color band changes in the display area of DMD 114.

Control unit 116, in accordance with the change of the irradiated position of each color light (red light, green light, blue light) contained the color band, controls drive signals of DMD 114. Specifically, control unit 116 causes DMD 114 to modulate the area where red light is irradiated in accordance with the signal component for red color. By performing modulation in the same manner for the other colors of light, it is possible to obtain a desired color image.

Projecting lens 115 magnifies the light (image light) reflected on DMD 114 and passed through TIR prism 113 and projects the resultant light.

In this way, light source device 100 of the present exemplary embodiment includes light source 101 for emitting laser light and first optical system 117 for condensing the laser light emitted from light source 101 in a rectangular shape. Light source device 100 also includes fluorescent wheel 109 having a plurality of phosphors emitting different colors of light in response to irradiation of laser light, formed thereon in such a manner that each of the multiple phosphors can be irradiated with the laser light condensed in a rectangular shape by first optical system 117. Light source device 100 further includes second optical system 118 for condensing color light emitted from the multiple phosphors and rotating prism 111 that is rotatably arranged on the optical path of the light condensed by second optical system 118 and shifts the optical axis of the light condensed by second optical system 118 as the prism turns.

Projector 10 of the present exemplary embodiment includes the above-mentioned light source device 100, DMD 114 as a modulating element, which receives irradiation of the light emitted from rotational prism 111 and modulates the irradiated light, and projecting lens 115 for projecting the light modulated by DMD 114. Projector 10 further includes control unit 116 that controls drive of DMD 114 in accordance with change of the irradiated position of each color light contained in the light emitted from rotating prism 111, resulting from the shift of the optical axis of the emitted light.

The excitation light emitted from light source 101 is condensed in a rectangular shape to irradiate multiple phosphors that emit different color light. Therefore, light of a rectangular shape (light beam) containing multiple color light, or a so-called color band can be obtained from fluorescent wheel 109. Then, the color band is made to irradiate on DMD 114 by shifting the optical axis of the color band using rotating prism 111, whereby DMD 114 is constantly irradiated with different color light so that a high luminance projected image can be obtained.

Further, DMD 114 is driven to modulate the irradiated light in accordance with changes in the illuminated position of each of the color light included in the color band, resulting from the shift of the optical axis of the color band, whereby it is possible to project a color image while preventing degradation of color reproducibility.

Since projector 10 is a single plate type, it is also possible to cut down manufacturing cost.

(The Second Exemplary Embodiment)

Though the first exemplary embodiment was described by giving an example of a single plate type projector, this exemplary embodiment will be described by taking an example of dual-plate type projector.

Figure 5:
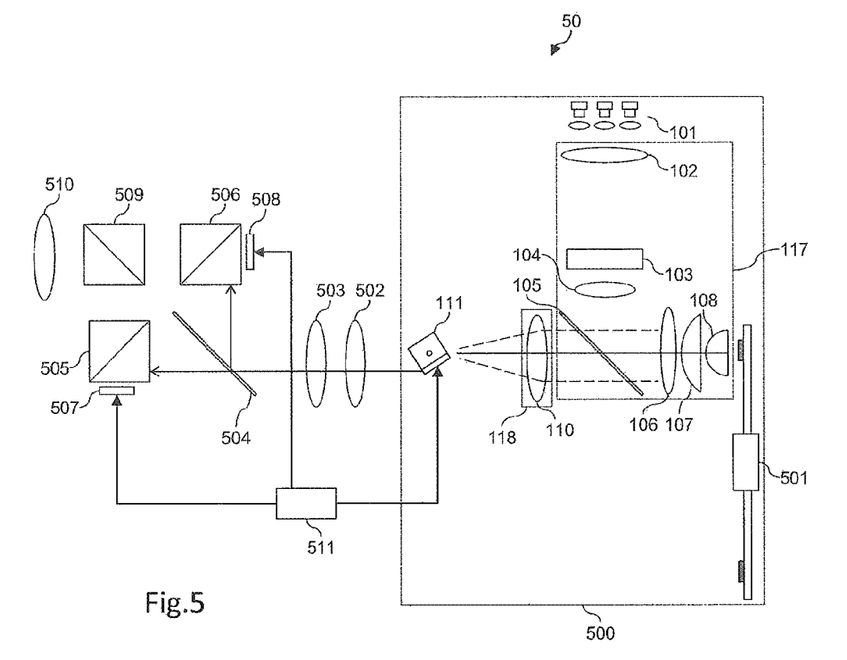
FIG. 5 is a diagram showing a configuration of a projector according to the second exemplary embodiment of the present invention.

FIG. 5 is a diagram showing a configuration of projector 50 according to the second exemplary embodiment of the present invention.

Projector 50 shown in FIG. 5 includes light source device 500, relay lenses 502, 503, dichroic mirror 504, polarizing beam splitters 505, 506, 509, liquid crystal panels 507, 508, projecting lens 510 and control unit 511.

Light source device 500 of this exemplary embodiment is different from light source device 100 of the first exemplary embodiment, in that fluorescent 109 is replaced by fluorescent wheel 501.

Figure 6:
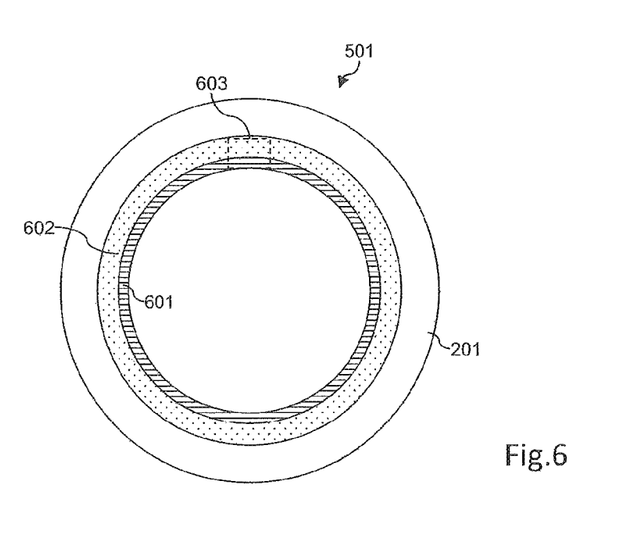
FIG. 6 is a diagram showing a configuration of the fluorescent wheel shown in FIG. 5.

FIG. 6 is a diagram showing a configuration of fluorescent wheel 501.

The fluorescent wheel shown in FIG. 6 includes substrate 201, phosphors 601 and 602.

Phosphors 601 and 602 emit a blue band fluorescence (blue light) and a yellow band fluorescence (yellow light), respectively, in response to irradiation of laser light emitted from light source 101.

In this way, fluorescent wheel 501 has multiple light emitting portions that emit different colors of light in response to irradiation of laser light.

Phosphors 601 and 602 are formed concentrically as shown in FIG. 6. Phosphor 601 and phosphor 602 are arranged adjacent to each other.

In the first exemplary embodiment, phosphor 202 is formed inside phosphor 203, and phosphor 204 is formed outside phosphor 203. Therefore, phosphor 203 is in contact with another phosphor on both interior and exterior sides. Forming a portion where two different kinds of phosphors come in contact requires special manufacturing technologies.

On the other hand, since, in the present exemplary embodiment, two kinds of phosphors alone are used so that the part where different kinds of phosphors come into contact can be reduced, whereby the degree of quality control that is needed in the manufacturing process can be reduced, thus improving yield.

Excitation light emitted from laser light source 101 is condensed in a rectangular shape by optical system 107, and is made to irradiate the rectangular area 603 in which strips of phosphors 601 and 602 are formed. As a result, in the present exemplary embodiment, a rectangular color band made up of blue light and yellow light can be obtained.

Referring again to FIG. 5, the light (color band) emitted from the phosphors on fluorescent wheel 501 passes through condenser lenses 106, 107, 108 and dichroic mirror 105 to irradiate condenser lens 110. Condenser lens 110 condenses the irradiated light into a shape approximately similar to the shape of the effective display area of liquid crystal panels 507 and 508 and gives off the light to rotating prism 111. Rotating prism 111 shifts the optical axis of the light (color band) emitted from condenser lens 110 as the prism turns and sends out the shifted light.

Relay lens systems 502, 503 focus the light emitted from condenser lens 110 on the display areas of liquid crystal panels 507, 508 at a predetermined magnification ratio, via dichroic mirror 504, polarizing beam splitters 505 and 506.

Dichroic mirror 504 has characteristics that reflect light in the red color band and allows light in the blue and green bands to pass therethrough, hence passes the blue light and green light therethrough toward polarizing beam splitter 505 and reflects the red light toward polarizing beam splitter 506.

Polarizing beam splitter 505 reflects the light (blue light and green light) emitted from dichroic mirror 504 toward liquid crystal panel 507. Polarizing beam splitter 505 passes the reflected light after having been modulated by liquid crystal panel 507 toward polarizing beam splitter 509.

Polarizing beam splitter 506 reflects the light (red light) emitted from dichroic mirror 504 toward liquid crystal panel 508. Polarizing beam splitter 506 passes the reflected light after having been modulated by liquid crystal panel 508 toward polarizing beam splitter 509.

Liquid crystal panels 507, 508 may employ a reflection type liquid crystal display such as LCoS (registered trademark) (Liquid Crystal on Silicon). Liquid crystal panels 507, 508 are one example of a modulating element. Since the modulating elements are liquid crystal panels, polarizing beam splitters 505, 506, 509 are used in the present exemplary embodiment.

Liquid crystal panel 507 modulates the light emitted from polarizing beam splitter 505 and emits the modulated light to polarizing beam splitter 505. Liquid crystal panel 508 modulates the light emitted from polarizing beam splitter 506 and emits the modulated light to polarizing beam splitter 509.

Though not illustrated in FIG. 5, wave plates, polarizers and others may be disposed right before liquid crystal panels 507 and 508. The illuminating optical system of projector 50 may use a polarized light conversion optical system. The polarized light conversion optical system is a well-known technology used in typical liquid crystal projectors, LCoS projectors and others.

Polarizing beam splitter 509 reflects the light, that was emitted from liquid crystal panel 507 and that passed through polarizing beam splitter 505, toward projecting lens 510. Polarizing beam splitter 509 also transmits the light that was emitted from liquid crystal panel 508 and that passed through polarizing beam splitter 506, toward projecting lens 510.

Projecting lens 510 magnifies the light emitted from polarizing beam splitter 509 and projects the magnified light.

Control unit 511 controls drives of rotating prism 111, liquid crystal panels 507 and 508.

Next, the operation of projector 50 will be described with reference to FIG. 5. Here, the process from when the excitation light emitted from light source 101 is condensed in a rectangular shape until irradiation of fluorescent wheel 501 is the same as that in the first exemplary embodiment, so description is omitted.

As shown in FIG. 6, the excitation light condensed in a rectangular shape is irradiated on rectangular area 603 that contains strips of phosphors 601 and 602. In response to irradiation of excitation light, phosphor 601 emits blue light while phosphor 602 emits yellow light. Accordingly, a rectangular color band in which strips of blue light and yellow light appear is obtained on fluorescent wheel 501.

Referring again to FIG. 5, light (color band) emitted from the phosphors of fluorescent wheel 501 is condensed into a shape approximately similar to the shape of the effective display area of liquid crystal panels 507 and 508 to be irradiated on rotating prism 111.

Rotating prism 111 rotates under control of control unit 511 and shifts the optical axis of the light (color band) emitted from condenser lens 110 as the prism turns and sends out the shifted light to relay lens system 502.

Relay lens systems 502, 503 focus the light emitted from rotating prism 111 on liquid crystal panels 507, 508 at a predetermined magnification ratio, via dichroic mirror 504, polarizing beam splitters 505 and 506. As described above, the optical axis of the color band shifts as rotating prism 111 turns. The shifting motion of the optical axis scrolls the color band that is focused on the display areas of liquid crystal panels 507, 508.

Dichroic mirror 504 reflects red light contained in yellow light of the color band toward polarizing beam splitter 506. Also, dichroic mirror 504 allows the blue light of the color band and green light contained in the yellow light of the color band to pass therethrough and propagate toward polarizing beam splitter 505.

Polarizing beam splitter 505 reflects the emitted light (blue light and green light) from dichroic mirror 504 toward liquid crystal panel 507. Polarizing beam splitter 506 reflects the emitted light (red light) from dichroic mirror 504 toward liquid crystal panel 508.

Figure 7A:
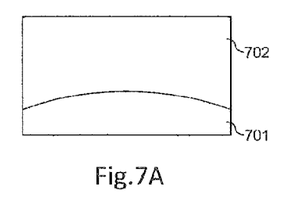
FIG. 7A is a diagram showing light irradiated on liquid crystal panel 507 shown in FIG. 6.
Figure 7B:
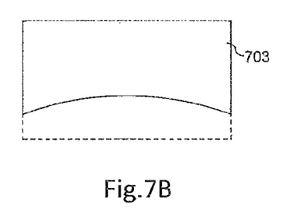
FIG. 7B is a diagram showing light irradiated on liquid crystal panel 508 shown in FIG. 6.

Irradiated on liquid crystal panel 507 is a full rectangular color band that contains blue light 701 and green light 702 as shown in FIG. 7A. On the other hand, liquid crystal panel 508 has a single color band of red light 703 that is irradiated as shown in FIG. 7B. This single color band has a shape that is partially hollowed in the vertical direction in the effective display area of liquid crystal panel 508. However, as described above, the irradiated position of the single color band (red light) is also scrolled on the display area of liquid crystal panel 508 as rotating prism 111 turns. Accordingly, it is possible to project color images by controlling the operation that drives the liquid crystal panels in synchronization with change of the irradiated position of each color light.

Here, the optical path that reaches liquid crystal panel 507 and the optical path that reaches liquid crystal panel 508 are partly independent from each other. Accordingly, a well-known optical element such as an anamorphic lens system for adjusting the magnification ratio with respect to the vertical direction of the light irradiated on liquid crystal panel 508 may be inserted on the optical path that is independent from the optical path that reaches liquid crystal panel 507 and that reaches liquid crystal panel 508.

Control unit 511 controls the operation that drives liquid crystal panel 507 in response to changes in the irradiated position of the color band (green light and blue light) irradiated on liquid crystal panel 507. Control unit 511 also controls the operation that drives liquid crystal panel 508 in response to changes in the irradiated position of the single color band (red light) irradiated on liquid crystal panel 508. In this way, it is possible to obtain a desired color image.

In the above way, in the present exemplary embodiment, light source device 500 includes fluorescent wheel 501 having phosphor 601 emitting blue fluorescence and phosphor 602 emitting yellow fluorescence, formed such that excitation light condensed in a rectangular shape is irradiated on phosphor 601 and phosphor 602.

Projector 50 includes the above-described light source device 500 and dichroic mirror 504 that separates the color band formed of blue light and yellow light emitted from light source device 500 into two color light components. Projector 50 further includes liquid crystal panel 507 modulating one separated light, liquid crystal panel 508 modulating the other separated light and projecting lens 510 for projecting the modulated light from liquid crystal panels 507 and 508.

In light source device 500, fluorescent wheel 501 has only two kinds of phosphors formed thereon. Accordingly, it is possible to simplify the configuration and facilitate manufacturing, compared to fluorescent wheel 109 of the first exemplary embodiment. Projector 50 is a dual plate projector having two modulating elements. In such a dual plate projector, it is also possible to perform projection of high-luminance images while inhibiting degradation of color reproducibility as the single plate projector of the first embodiment does.

Figure 8A:
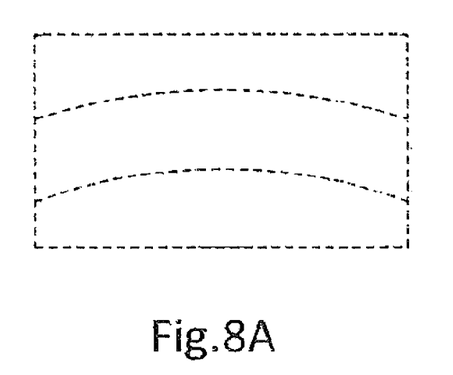
FIG. 8A is a diagram showing the shape of each color light contained in the color band.

Here, in the above described exemplary embodiments, for example the color band obtained has a rectangular shape as a whole, as shown in FIG. 3. However, each color light that forms the color band has a arc shape as shown in FIG. 8A. Since light of this arc shape is focused on the modulating element, drive control of pixels that constitutes the modulating element needs to be controlled in accordance with the external shape. In general, the pixels forming a modulating element are arranged matrixwise. Accordingly, taking into account the driving operation for driving the modulating element, it is preferable that the external shape of each color light constituting the color band be defined linearly.

In order to define the external shape of each color light that forms the color band with linear lines, one idea that might occur is to make the diameter of the fluorescent wheel, i.e. the diameters of the phosphors that are formed in annular shapes, greater. However, this method entails cost increase due to enlargement of the fluorescent wheel and due to an increase in the required amount of fluorescent materials. Further, this method cannot define the external shape of each color light forming the color band, perfectly linearly.

Figure 8B:
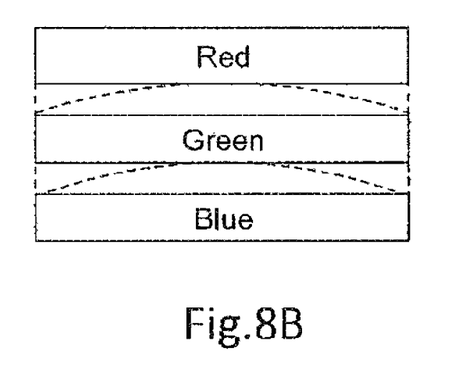
FIG. 8B is a diagram for illustrating one example of a driving method of a modulating element.
Figure 8C:
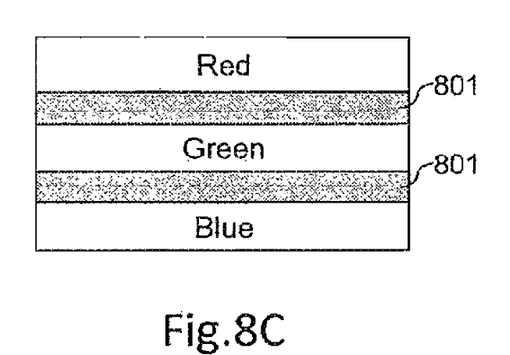
FIG. 8C is a diagram for illustrating one example of a driving method of a modulating element.

To deal with this, as shown in FIG. 8B a method of using only the light irradiated in rectangular areas from the circular arc-shaped light irradiated on the modulating element can be considered as a variational example. In this method, as shown in FIG. 8C, in the areas on the modulating element, irradiated with individual colors of circularly arc-shaped light, each color light in the individual rectangle is modulated while the other areas, designated at 801, are displayed in black. Use of a display in black slightly lowers the luminance of the projected image, but it is possible to reduce the load imposed on drive of the modulating element.

The widths of the annular phosphors formed on the fluorescent wheel may be determined arbitrarily depending on the light emitting efficiencies of the phosphors, the light amount balance between red light, green light and blue light forming white color.

Further, though the above exemplary embodiments were described by giving examples in which irradiation of excitation light on the fluorescent wheel is performed from the obverse side of the phosphors, the present invention should not be limited to this. As a variational example, irradiation of excitation light may be performed from the reverse side of the phosphors. In the following description, the fluorescent wheel in which irradiation is performed on the rear side is referred to as a transmission type fluorescent wheel.

The substrate of a transmission type fluorescent wheel preferably uses a transparent type. The advantage of using a transmission type fluorescent wheel resides in that it is possible to use, for example blue laser light having a wavelength of about 440 nm as both the excitation light and the illuminating light. As a result, it is possible to reduce the kinds and quantities of phosphors formed on the fluorescent wheel, hence simplify the configuration of the fluorescent wheel.

Figure 9:
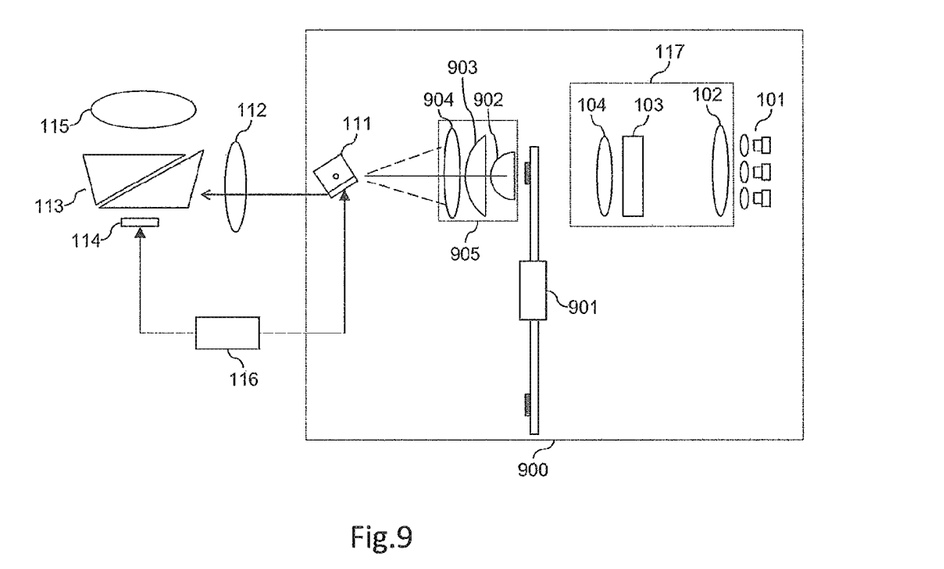
FIG. 9 is a diagram showing a configuration of a projector according to a variational example.

FIG. 9 is a diagram showing a configuration of projector 90 including light source device 900 having a transmission type fluorescent wheel. FIG. 9 shows a single plate type projector as an example of projector 90. Since only the configuration of the light source device of projector 90, shown in FIG. 9, is different compared to projector 10 shown in FIG. 1, the following description will be made on the configuration of light source device 900.

Light source device 900 shown in FIG. 9 includes light source 101, illuminating lens system 102, fly eye lens 103, illuminating lens system 104, fluorescent wheel 901, condenser lens systems 902, 903, 904 and rotating prism 111.

Optical system 117 constituted of illuminating lens 102, fly eye lens 103 and illuminating lens system 104 condenses laser light (excitation light) emitted from light source 101 in a rectangular shape, and irradiates the reverse side of fluorescent wheel 901.

Figure 10:
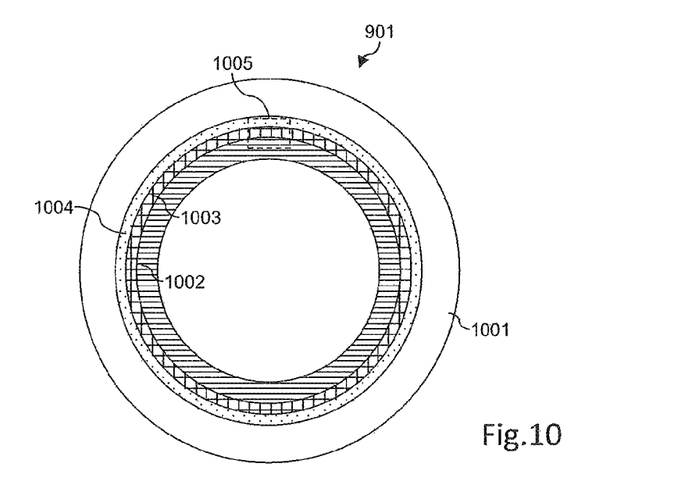
FIG. 10 is a diagram showing a configuration of the fluorescent wheel shown in FIG. 9.

FIG. 10 is a diagram showing the configuration of fluorescent wheel 901.

Fluorescent wheel 901 includes substrate 1001, diffusing area 1002, phosphors 1003 and 1004.

Substrate 1001 is a circular substrate made of transparent material.

Diffusing area 1002 diffuses blue laser light irradiated on the reverse side of substrate 1001 and gives off the diffused light from the obverse side. Here, diffusing area 1002 may be formed by implementing a treatment for diffusing blue laser light directly on substrate 1001, or by applying a separately formed diffusing plate thereto.

Phosphors 1003 and 1004 emit green fluorescence (green light) and red fluorescence (red light), respectively in response to irradiation of laser light emitted from light source 101.

In this way, fluorescent wheel 901 has multiple light emitting portions that emit different colors of light in response to irradiation of laser light.

Diffusing area 1002, phosphors 1003 and 1004 are formed concentrically as shown in FIG. 10. Here in FIG. 10, diffusing area, phosphor 1003 and phosphor 1004 are formed concentrically in the order mentioned from the interior side. However, the order is not limited to this. For example, it is possible to form phosphor 1003 on the inner side of diffusing area 1002 and phosphor 1004 on the outer side of diffusing area 1002. Further, diffusing area 1002 may be formed on the side of phosphor fluorescent wheel 901 (the reverse side of the substrate) on which excitation light is incident. These sorts of configurations are advantageous in facilitating manufacturing and simplifying the configuration.

Excitation light is irradiated on rectangular area 1005 including diffusing area 1002, phosphors 1003 and 1004, as shown in FIG. 10. Accordingly, a rectangular color band in which strips of blue light, green light and red light appear is obtained on fluorescent wheel 901.

Referring again to FIG. 9, condenser lens systems 902, 903 and 904 condense light (color band) emitted from the phosphors of fluorescent wheel 109 in a shape approximately similar to the display area of DMD 114 and send out the beam to rotating prism 111. Condenser lens systems 902, 903 and 904 constitute second optical system 904

Rotating prism 111 shifts the optical axis of the light (color band) emitted from condenser lens 904 as the prism turns and sends out the shifted light to relay lens 112.

Since the configurations and operation that follow are the same as those of projector 10, description is omitted.

In this way, use of a transmission type fluorescent wheel also makes it possible to perform high-luminance projection, and inhibit deterioration of color reproducibility. In dual-plate type projector 50 shown in FIG. 5, instead of fluorescent wheel 501, a transmission type fluorescent wheel may be used. In this case, instead of phosphor 601, a diffusing plate may be arranged in the area formed with phosphor 601 for emitting blue light. This arrangement only needs one kind of phosphor, so that it is possible to further simplify the configuration of the fluorescent wheel.

Figure 11A:
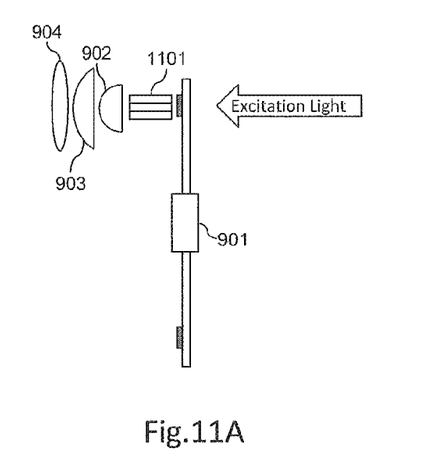
FIG. 11A is a diagram showing partial components of a light source device according to a variational example.

As another variational example, in a light source device having a transmission type fluorescent wheel, rod integrator 1101 may be arranged to depend on the irradiated position of the excitation light between fluorescent wheel 901 and condenser lens system 902 as shown in FIG. 11A. The role of rod integrator 1101 is to improve uniformity of the light emission distribution of the color band emitted from fluorescent wheel 901, form the color band into a rectangular shape and make the colors of the band closer to each other.

As shown in FIG. 10, fluorescent wheel 901 has circularly arced phosphors and a diffusing area formed thereon. As stated above, it is preferable in view of driving the modulating element, that the external shape of each color of light forming the color band be defined linearly.

Figure 11B:
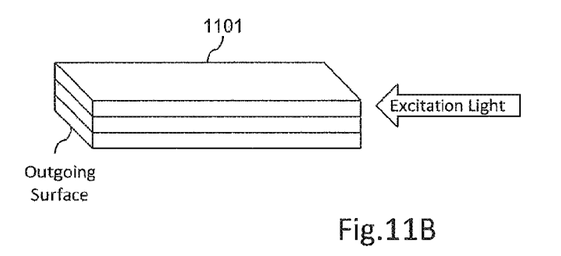
FIG. 11B is a diagram showing a configuration of the rod integrator shown in FIG. 11A.

In view of this, each arc-shaped color light is made incident on rectangular rod integrator 1101 as shown in FIG. 11B. Herein, rod integrator 1101 is formed of three rod integrators applied. Further, the interface between rod integrators is formed with a reflective surface. That is, rod integrator 1101 is a rod integrator stack formed of multiple rod integrators that are laminated together.

Here, the light incident on the opening of each rectangular prism-shaped rod integrator is not necessarily a single color of light. The reason is that the phosphors and diffusing area are arc-shaped, and these arc-shaped areas emit light.

Figure 11C:
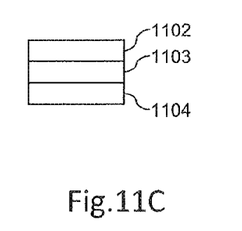
FIG. 11C is a diagram showing the outgoing surface of the rod integrator shown in FIG. 11A.

Even if different color light enters a rod integrator, it is possible to cause the effective color light to be emitted as the color band by implementing appropriate dichroic mirror coating on the outgoing surface of the rod integrator. In this exemplary embodiment, among the three rod integrators forming rod integrator 1101, outgoing surface 1102 of one rod integrator is provided with such a treatment as to present characteristics of transmitting blue light and reflecting green light. Also, among the three rod integrators forming rod integrator 1101, outgoing surface 1103 of another rod integrator is provided with such a treatment as to present characteristics of transmitting green light and reflecting blue light and red light. Further, among the three rod integrators forming rod integrator 1101, outgoing surface 1104 of the other rod integrator is provided with such a treatment as to present characteristics of transmitting red light and reflecting green.

These treatments makes it possible to obtain a color band in which different color light appears in linear form without color mixture. The process for producing the above-described characteristics is well known to those skilled in the art, so detailed description is omitted.

Although the present invention has been explained with reference to the exemplary embodiments, the present invention should not be limited to the above exemplary embodiments.

Various modifications that can be understood by those skilled in the art may be made to the structures and details of the present invention within the scope of the present invention.

The invention claimed is:

1. A light source device comprising:
   a light source for emitting excitation light;
   a first optical system for condensing excitation light emitted from the light source into a rectangular shape;
   a fluorescent wheel having a plurality of light emitting portions emitting different color light in response to irradiation of the excitation light formed in such a manner in which each of the multiple light emitting portions is irradiated with the excitation light condensed in a rectangular shape by the first optical system;
a second optical system for condensing color light emitted from each of the multiple light emitting portions in response to irradiation of the rectangularly condensed excitation light; and
a rotating prism that is rotatably arranged on the optical path of the light condensed by the second optical system and that shifts the optical axis of the light condensed by the second optical system as the prism turns.

2. The light source device according to claim 1, wherein the fluorescent wheel is provided rotatably.

3. The light source device according to claim 1, wherein the multiple light emitting portions are concentrically formed so that they adjoin each other.

4. The light source device according to claim 1, wherein the multiple light emitting portions include a light emitting portion formed with a phosphor emitting red fluorescence in response to irradiation of the excitation light, a light emitting portion formed with a phosphor emitting green fluorescence in response to irradiation of the excitation light and a light emitting portion formed with a phosphor emitting blue fluorescence in response to irradiation of the excitation light.

5. The light source device according to claim 1, wherein the multiple light emitting portions include a light emitting portion formed with a phosphor emitting yellow fluorescence in response to irradiation of the excitation light and a light emitting portion formed with a phosphor emitting blue fluorescence in response to irradiation of the excitation light.

6. The light source device according to claim 1, wherein the light source emits blue laser light,
the fluorescent wheel is formed of a transmissive substrate, the laser light being irradiated on the fluorescent wheel from the reverse side of the surface formed with the light emitting portions, and,
the multiple light emitting portions include a light emitting portion formed with a phosphor emitting red fluorescence in response to irradiation of the excitation light, a light emitting portion formed with a phosphor emitting green fluorescence in response to irradiation of the excitation light and a light emitting portion emitting diffused light of the blue laser light that is irradiated from the reverse side and diffused therethrough.

7. The light source device according to claim 6, wherein a rectangular prism-shaped rod integrator is provided between the fluorescent wheel and the second optical system.

8. A projector comprising:
a light source device according to claim 1;
a modulating element that is irradiated with light emitted from the rotating prism and that modulates the irradiated light;
a projecting optical system that projects the light modulated by the modulating element; and,
a control unit that controls the operation that drives the modulating element in accordance with changes in the irradiated position of each color light included in the light, resulting from the shift of the optical axis of the light emitted from the rotating prism.

9. The projector according to claim 8, wherein the control unit causes the modulating element to modulate individual color light, in the rectangular area that is irradiated with each color light contained in the light emitted from the rotating prism.

10. A control method of a light source device comprising:
emitting excitation light;
condensing the emitted excitation light into a rectangular shape;
irradiating a fluorescent wheel formed with a plurality of light emitting portions for emitting different color light in response to irradiation of the excitation light in such a manner in which each of the multiple light emitting portion is irradiated with the excitation light condensed in a rectangular shape;
condensing color light emitted from each of the multiple light emitting portions in response to irradiation of the rectangularly condensed excitation light; and
shifting the optical axis of the condensed light of color light emitted from each of the multiple light emitting portions, by a rotating prism that is rotatably provided on the optical path of the condensed light of color light emitted from the multiple light emitting portions.

* * * * *